US008432998B2

(12) United States Patent
Ito

(10) Patent No.: US 8,432,998 B2
(45) Date of Patent: Apr. 30, 2013

(54) DEVICE FOR CHANNEL ESTIMATION IN A MULTIPLE SUBCARRIER CDMA SYSTEM USING A BLOCK OF MULTIPLE SUBCARRIERS BY MULTIPLE SYMBOLS AND METHOD THEREOF

(75) Inventor: Akira Ito, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 930 days.

(21) Appl. No.: 10/739,144

(22) Filed: Dec. 19, 2003

(65) Prior Publication Data

US 2004/0131022 A1    Jul. 8, 2004

Related U.S. Application Data

(63) Continuation of application No. PCT/JP01/08541, filed on Sep. 28, 2001.

(51) Int. Cl.
H04L 27/00 (2006.01)
H04L 1/00 (2006.01)
H04L 1/02 (2006.01)

(52) U.S. Cl.
USPC ........... 375/316; 375/346; 375/347; 375/295; 375/219

(58) Field of Classification Search .................. 370/209, 370/206, 210, 310, 320, 441; 375/130, 132, 375/242, 219, 222, 295, 299, 316, 324, 339, 375/346, 347, 348, 349, 354
See application file for complete search history.

(56) References Cited

U.S. PATENT DOCUMENTS

| 5,559,790 | A | 9/1996 | Yano et al. | |
|---|---|---|---|---|
| 6,282,185 | B1 * | 8/2001 | Hakkinen et al. | 370/342 |
| 6,452,917 | B1 * | 9/2002 | Leung | 370/342 |
| 6,621,808 | B1 * | 9/2003 | Sadri | 370/335 |
| 6,690,652 | B1 * | 2/2004 | Sadri | 370/252 |
| 6,785,350 | B1 * | 8/2004 | Poulbere et al. | 375/343 |
| 7,149,199 | B2 * | 12/2006 | Sung et al. | 370/330 |
| 7,212,578 | B2 * | 5/2007 | Lee et al. | 375/267 |
| 2002/0041635 | A1 * | 4/2002 | Ma et al. | 375/267 |
| 2002/0159422 | A1 * | 10/2002 | Li et al. | 370/342 |
| 2003/0026200 | A1 * | 2/2003 | Fu et al. | 370/208 |
| 2004/0071193 | A1 * | 4/2004 | Atarashi et al. | 375/144 |
| 2004/0178954 | A1 * | 9/2004 | Vook et al. | 342/383 |
| 2005/0013350 | A1 * | 1/2005 | Coralli et al. | 375/148 |

FOREIGN PATENT DOCUMENTS

| EP | 0910181 | A2 * | 4/1999 |
|---|---|---|---|
| EP | 910181 | A2 * | 4/1999 |
| EP | 1 128 592 | A2 | 8/2001 |
| EP | 1128592 | A2 * | 8/2001 |

(Continued)

OTHER PUBLICATIONS

Choi et al, Crest-factor study of MC-CDMA and OFDM, IEEE, vol. 1, pp. 233-237, Sep. 1999.*

(Continued)

Primary Examiner — Sam K Ahn
Assistant Examiner — Linda Wong
(74) Attorney, Agent, or Firm — Staas & Halsey LLP

(57) ABSTRACT

A channel prediction value is obtained by storing pilot signals for four symbols and 1,024 sub-carriers in a time and sub-carrier directions, respectively, multiplying a received pilot signal by the Walsh code of a channel to which channel prediction is applied, for each block of four symbols-by-eight sub-carriers and adding the products of the block including eight sub-carriers centered on a sub-carrier, to which channel prediction is applied.

18 Claims, 11 Drawing Sheets

FOREIGN PATENT DOCUMENTS

| WO | WO 9810542 A2 * | 3/1998 |
|---|---|---|
| WO | WO 00/65798 | 11/2000 |
| WO | 01/48959 | 7/2001 |

OTHER PUBLICATIONS

Yukiko Hanada et al., "2-Step Fast Cell Search Method and Its Performance for Broadband Multi-carrier CDMA Wireless Access," Technical Report of IEICE RCS2000-68, Jul. 2000, pp. 119-126.

Yukiko Hanada et al., "3-Step Fast Cell Search Method and Its Performance for Broadband Multi-carrier CDMA Wireless Access," Technical Report of IEICE RCS2000-170, Nov. 2000, pp. 49-55.

Stefan Kaiser et al., "Performance of Multi-Carrier CDMA Systems with Channel Estimation in Two Dimensions," IEEE PIMRC '97, Sep. 1997, pp. 115-119.

Atsushi Mizuki et al., "A Channel Estimation Scheme with the Correlation of the Symbols in the Time-Domain and the Subcarrier in OFDM System," Technical Report of IEICE RCS2001-87, Jul. 2001, pp. 49-54.

Shinsuke Hara et al., "Overview of Multicarrier CDMA," IEEE Communications, Dec. 1997, pp. 126-133.

Sadayuki Abeta et al., "Performance of Coherent Multi-Carrier/DS-CDMA and MC-CDMA for Broadband packet Wireless Access," IEICE Trans. Commun., vol. E84-B, No. 3, Mar. 2001, pp. 406-414.

Office Action for Chinese Application No. 01823534.4, Jul. 8, 2005.

Supplemental European Search Report for European Application 01972583.7, dated Apr. 4, 2006.

European Office Action for European Application No. 01 972 583. 7-2415; dated Dec. 4, 2006.

Chinese Office Action dated Nov. 7, 2008 for corresponding Chinese Patent Application No. 01823534.4.

Jinho Choi, "Channel Estimation for Coherent Multi-Carrier CDMA Systems Over Fast Fading Channels"; Proceedings of 51st IEEE Conference on Vehicular Technology, vol. 1 of 3, May 15, 2000, pp. 400-404.

* cited by examiner

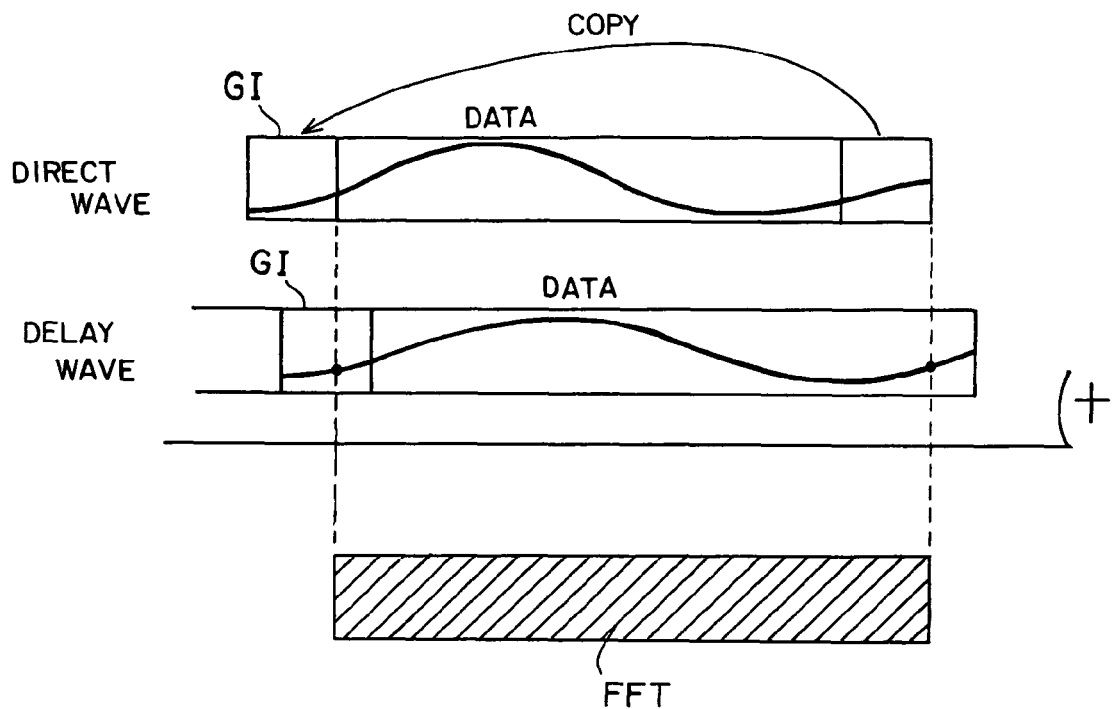
F I G. 4

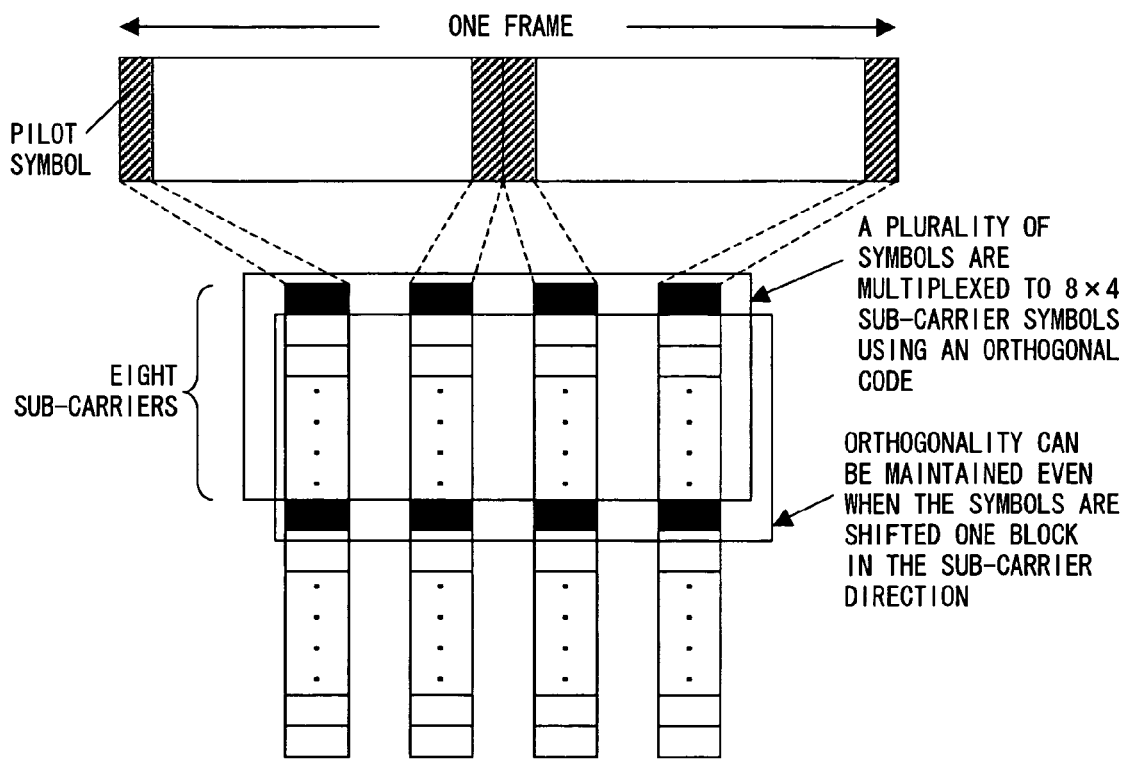
F I G. 7

DEVICE FOR CHANNEL ESTIMATION IN A MULTIPLE SUBCARRIER CDMA SYSTEM USING A BLOCK OF MULTIPLE SUBCARRIERS BY MULTIPLE SYMBOLS AND METHOD THEREOF

CROSS REFERENCE TO RELATED APPLICATION

This application is a continuation of international PCT application NO. PCT/JP01/08541 filed on Sep. 28, 2001.

BACKGROUND OF THE INVENTION

1. Field of the Invention

The present invention relates to a channel prediction device in an OFDM (Orthogonal Frequency Divisional Multiplexing)-CDMA (Code Divisional Multiple Access) system and a method thereof.

2. Description of the Related Art

Recent advancements in communication technologies have been remarkable and systems communicating large amounts of data at high speed have been realized. This phenomenon not only applies to wired communication, but also wireless communication. Specifically, with the spread of mobile terminals, such as, cellular phones and the like, research and development has created wireless systems where a large amount of data can be communicated at high speed, and multimedia data, such as dynamic images, voice and the like, can be handled by mobile terminals.

Recently, high-speed wireless communication based on CDMA called "the third generation" has been developed and is about to be put into practical use. In response to this trend, wireless communication R&D departments have started to research and develop the fourth generation wireless communication system aiming at larger-capacity and higher-speed wireless communication.

OFDM-CDMA is a strong candidate for the basic system of the fourth generation mobile communication system. In this system, an OFDM technology for transmitting a plurality of pieces of data in parallel using a plurality of sub-carriers each with a mutually orthogonal frequency and a CDMA technology using the orthogonality of a spread code by which user data is multiplied when a plurality of pieces of user data are multiplexed, are united in order to realize larger-capacity, higher-quality and higher-speed communication.

However, currently the OFDM-CDMA system is still in a proposal stage and in an R&D evaluation stage, and individual technologies required for an actual system must be developed.

In particular, channel prediction conducted in the third generation W-CDMA system and the like must also be conducted in an OFDM-CDMA system. In this case, the channel prediction value is indispensable for restoring amplitude modulation or phase rotation that signals undergo in order to propagate in the air, to normal and for detecting correct signals. However, when the channel prediction value is calculated in a W-CDMA system, usually a channel prediction value averaged in a time direction is used.

Since signals are affected by noise when propagate in the air, the influence of noise must be eliminated. Therefore, in order to obtain a correct channel prediction value in a W-CDMA system, channel prediction values calculated using a plurality of pilot signals are averaged in a time direction.

However, in an OFDM-CDMA system, in order to obtain a more accurate channel prediction value, channel prediction values are averaged not only in a time direction but also in a sub-carrier direction, since a plurality of sub-carriers are used.

However, the detailed contents of a method for calculating a channel prediction value in an OFDM-CDMA system are not still unclear.

SUMMARY OF THE INVENTION

An object of the present invention is to provide a channel prediction device in an OFDM-CDMA system and a method thereof.

A channel prediction device in the present invention uses a plurality of sub-carriers in a CDMA system. The channel prediction device comprises an extraction/despreading means for extracting a pilot signal from a received signal, despreading the spreading by a spread code for inter-cell separation and outputting the despread signal; block despreading means for obtaining output by despreading the spreading by a spread code for channeling of a block composed of a plurality of symbols and a plurality of adjacent sub-carriers obtained from the output of the extraction/despreading means; and channel prediction means for obtaining a channel prediction value by adding all the signal values of the block that are obtained by the block despreading means.

A channel prediction method in the present invention uses a plurality of sub-carriers in a CDMA system. The channel prediction method comprises extracting a pilot signal from a received signal, despreading the spreading by a spread code for inter-cell separation and outputting the despread signal (extraction/despreading step); obtaining output by despreading the spreading by a spread code for channeling, of a block composed of a plurality of symbols and a plurality of adjacent sub-carriers which are the output obtained in the extraction/despreading step (block despreading step); and obtaining a channel prediction value by adding up all the signal values of the block that are obtained by the block despreading step (channel prediction step).

According to the present invention, when channel prediction is conducted in a CDMA system with a plurality of sub-carriers, a high-accuracy channel prediction value with reduced noise can be easily obtained by adding and averaging signal values not only in a time direction conventionally, but also in a sub-carrier direction.

BRIEF DESCRIPTION OF DRAWINGS

FIG. 4 shows a guard interval;

FIG. 7 shows the basic operation in the preferred embodiment of the present invention;

DESCRIPTION OF THE PREFERRED EMBODIMENTS

Figure 1:
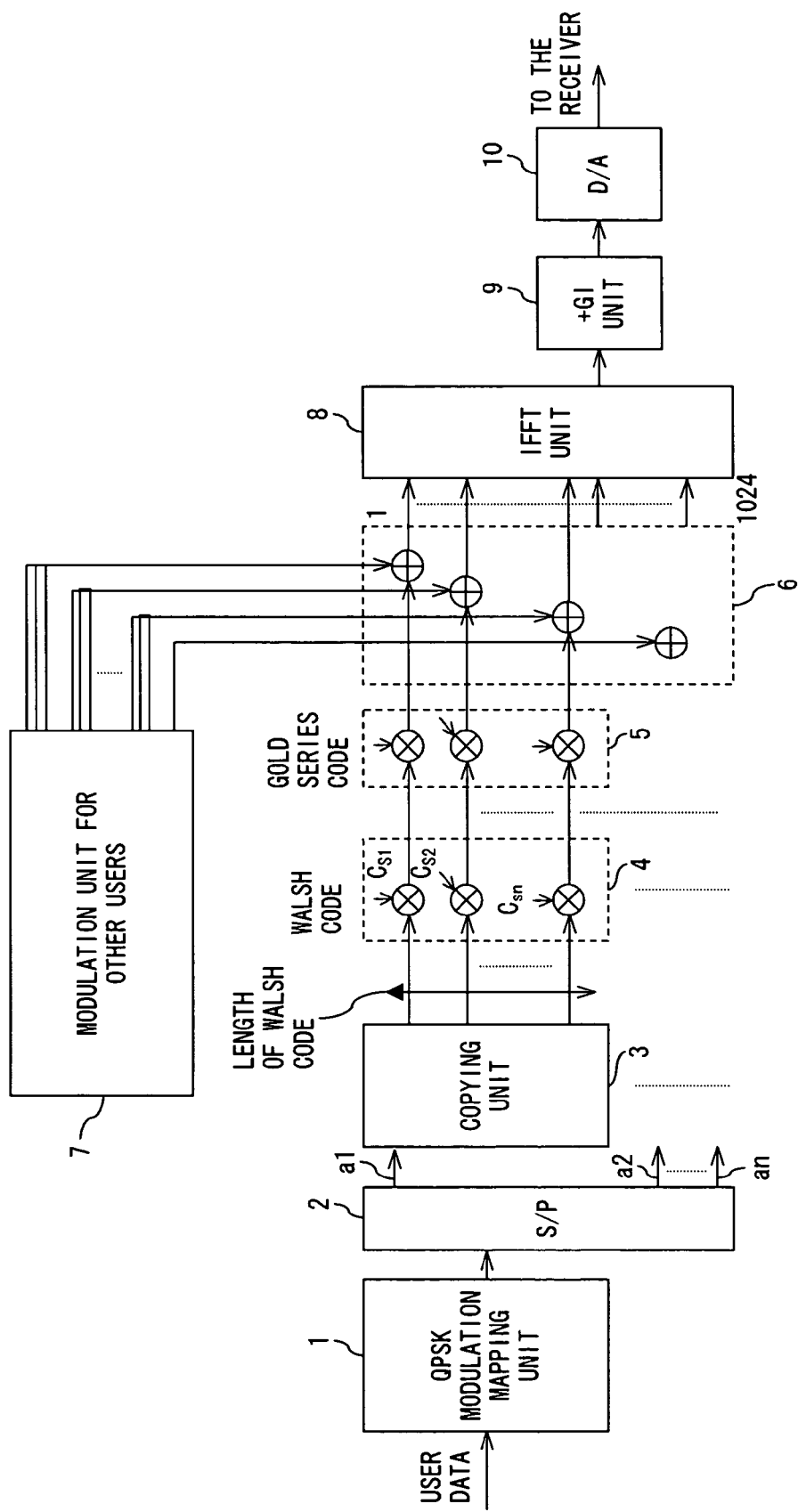
FIG. 1 shows the basic configuration of a transmitter in an OFDM-CDMA system.

FIG. 1 shows the basic configuration of a transmitter in an OFDM-CDMA system.

A QPSK modulation mapping unit 1, for example, quadrature-modulates input user data. This modulation method is an example, and the modulation method is not necessarily limited to this QPSK modulation. A serial/parallel converter 2 converts the modulated user data from serial to parallel. For example, one symbol of the user data modulated for one time slot is output to the output a1 of the serial/parallel converter 2. Similarly, one symbol of the user data modulated in the same timing is output to each of the outputs a2 through the output an.

A copying unit 3 copies each modulated signal symbol output from the serial/parallel converter 2 and obtains sn copied modulation signal symbols. Then, a multiplier 4 multiplies each of the sn copied modulation signal symbols by each chip of a spread code (in this case, Walsh code) for specifying a channel. In this case, the Walsh code is sn chip long. Therefore, each of the sn copied modulation signal symbols is multiplied by the sn different chips of a Walsh code.

Then, each of the modulated signal symbols multiplied by a Walsh code is further multiplied by a spread code (in this case, gold series code) for specifying the cell of each base station. Then, another user data transmitted from a modulation unit 7 for another user is modulated. Then, an adder 6 adds the signals processed in the same way and inputs the signals to an IFFT (Inverse Fast Fourier Transformation) unit 8.

Each signal input to the IFFT unit 8 is regarded as a frequency component and inverse Fourier transformation is applied to the signal. Then, each signal is output as one modulation wave. Specifically, if the IFFT unit 8 has 1,024 inputs, the number of the frequency components is 1,024. Therefore, 1,024 sub-carriers with a frequency component are combined and the combined sub-carrier is output.

The IFFT unit 8 performs inverse Fourier transformation using a sub-carrier with the fundamental frequency and sub-carriers each with a frequency obtained by multiplying the fundamental frequency by an integer. If all the sub-carrier frequencies are obtained by multiplying one another by an integer, an integration for one cycle of the product of a sub-carrier with a frequency obtained by multiplying the fundamental frequency by an integer and the sub-carrier with the fundamental frequency is 0 and only an integration for one cycle of the product of sub-carriers with the same frequency is a finite value. In other words, a sub-carrier with a specific frequency is orthogonal to another sub-carrier with a frequency obtained by multiplying the fundamental frequency by an integer. The word "orthogonal" in OFDM derives from this fact.

In this way, a guard interval addition unit (+GI unit) 9 attaches a guard interval, which is described later, to each signal wave output from the IFFT unit 8 and the signal waves each with a guard interval are transmitted. Up to this point, signals are digitally processed. A D/A converter 10 converts the signals from digital to analog and transmits the signals to a transmitter.

Figure 2:
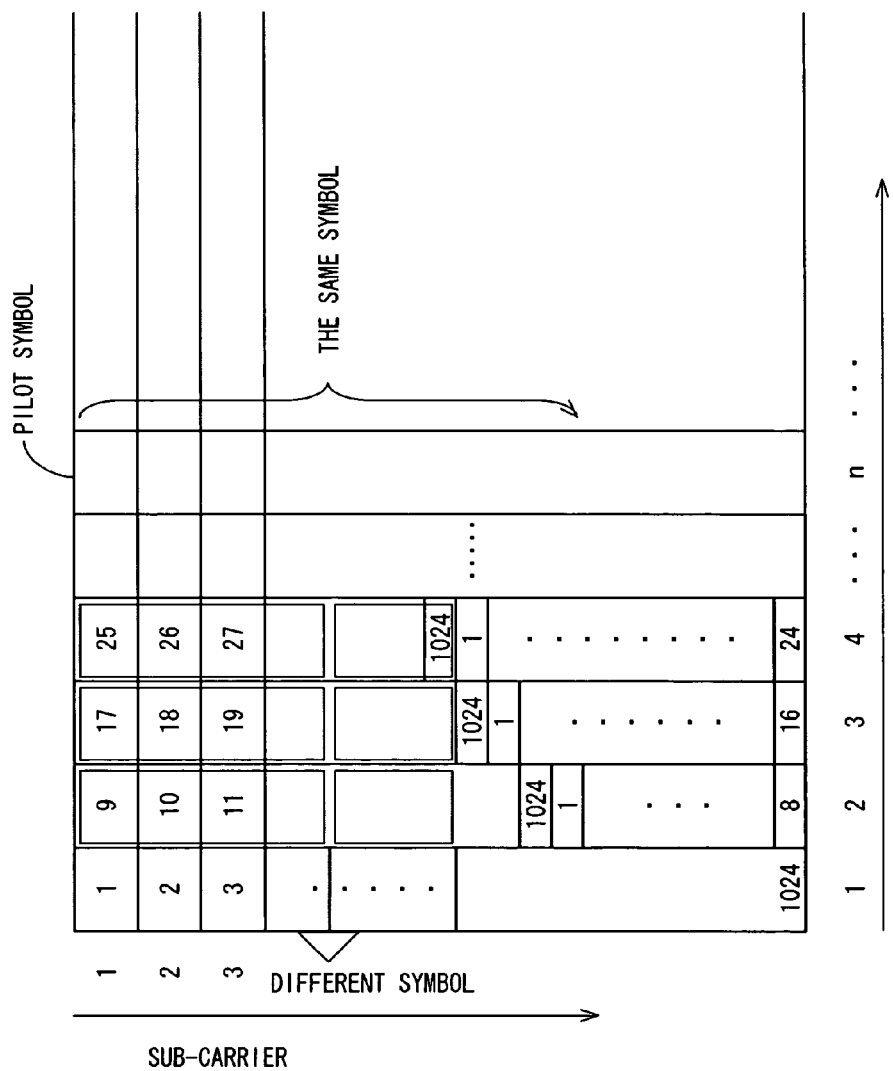
FIG. 2 shows how each modulation signal symbol is arrayed in a matrix when a sub-carrier and time (time slots) are taken as the vertical and horizontal axes, respectively.

FIG. 2 shows how each modulation signal symbol is arrayed in a matrix when a sub-carrier and time (time slots) are taken as the vertical and horizontal axes, respectively.

Each modulation signal is packed into a frame. The frame is composed of at least data and a pilot signal. In this example, the number of sub-carriers is 1,024. It is also assumed that a Walsh code is composed of 32 chips. In this case, if it is assumed that data is composed of time slots 1 through 4, one symbol is stored in sub-carriers 1 through 32 and one symbol is stored in sub-carriers 33 through 64 of the time slot 1 of data. As a result, the time slot 1 accommodates 32(=1,024/32) symbols in total.

Although a subsequent time slot 2 accommodates symbols in the same way, the respective multiplication methods of a Walsh code and a gold series code are different from those of time slot 1. Specifically, 1,024 chips of a code are generated by combining Walsh codes and gold series codes. For example, as shown in FIG. 2, in the time slot 2, symbols are multiplied after shifting by eight chips. In a time slot 3, symbols are multiplied after shifting by eight more chips. In a time slot 4, symbols are multiplied after shifting by another eight more chips. In this way, the multiplication timing of a spread code is shifted in each time slot.

So far, the relation between the symbol array and spread codes in data has been described. A pilot signal has a different structure from that of data. For example, if a time slot n accommodates one pilot signal symbol, this pilot signal symbol is commonly accommodated for 1,024 sub-carriers. Four pilot symbols, as described later, are included, for example, in one frame, but each symbol is the same. The Walsh code multiplication method of the pilot signal is different from that of data, which is described later.

Figure 3:
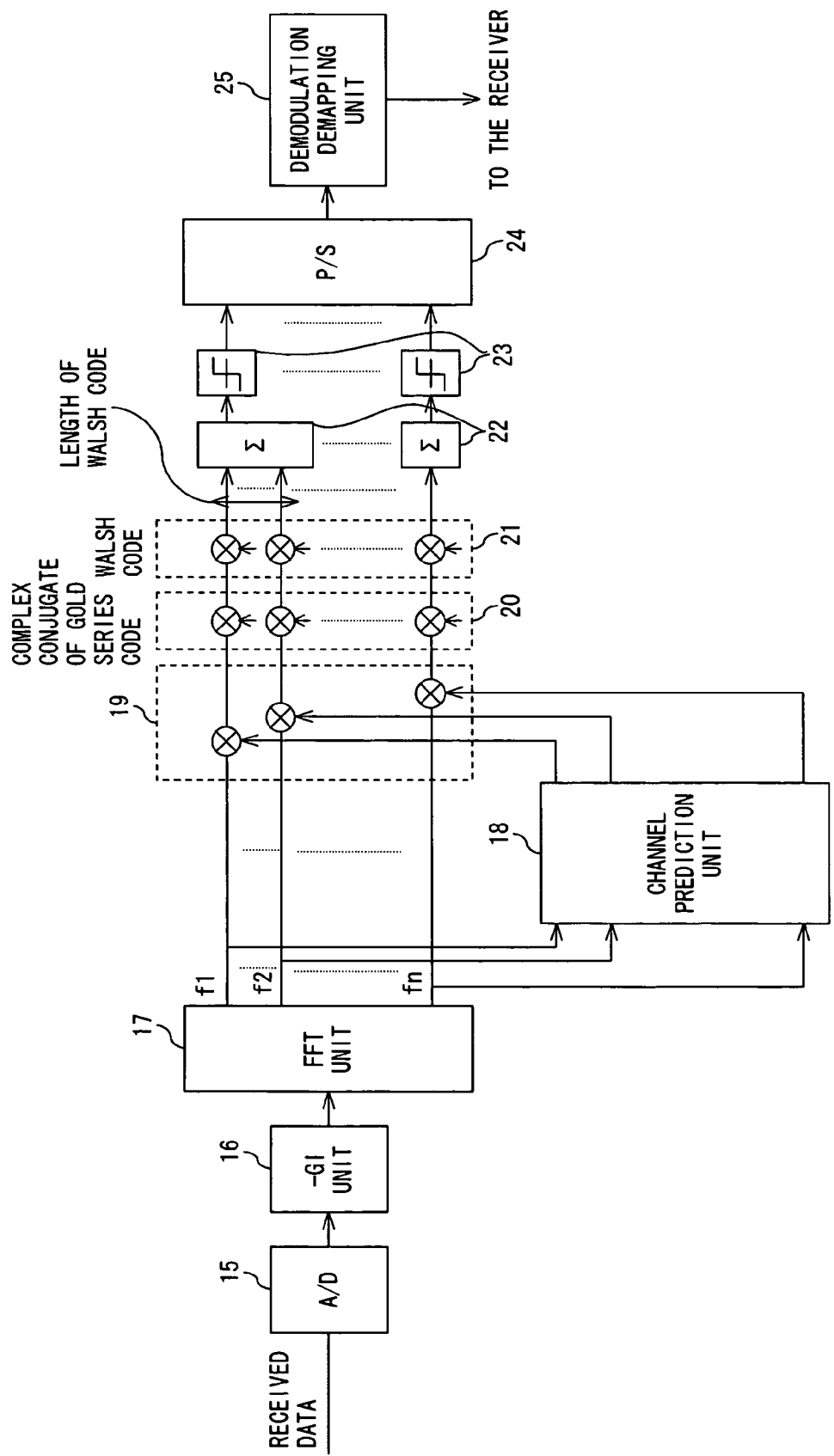
FIG. 3 shows the basic configuration of a receiver in an OFDM-CDMA system.

FIG. 3 shows the basic configuration of a receiver in an OFDM-CDMA system.

An A/D converter 15 first converts received data from analog to digital. Then, a guard interval elimination unit (−GI unit) 16 eliminates a guard interval from the data and inputs the resulting data to an FFT (Fast Fourier Transformation) unit 17. Then, the FFT unit 17 decomposes a signal wave in time domain into frequency components by means of Fourier transformation. In other words, a transmitter regards user data's modulation signal symbols as frequency components and converts the user data's modulation signal symbols into signal waves in time domain by means of inverse Fourier transformation. However, the FFT unit 17 extracts frequency components from a signal wave in time domain by means of Fourier transformation, which is the reverse of inverse Fourier transformation, that is, extracts the user data's modulation signal symbols.

A channel prediction unit 18 uses the modulation pilot signal symbol of each of the frequency components f1 through fn obtained by the FFT unit 17, to calculate a channel prediction value. A channel compensation unit 19 applies channel correction to each of the frequency components f1 through fn. Then, a multiplier 20 multiplies each frequency by the complex conjugate code of the gold series code used in the transmitter. Then, a multiplier 21 multiplies each frequency by a Walsh code. In this stage, the user data's modulation signal symbol is demodulated and an adder 22 adds all signals including a specific symbol. Then, a symbol judger 23 judges the value of the symbol. Then, a parallel/serial converter 24 converts the judged symbol value from parallel to serial and inputs the symbol values to a demodulation demapping unit 25. The demodulation demapping unit 25 demodulates the user data modulated in the transmitter and extracts the user data. Then, the demodulation demapping unit 25 transmits the user data to a receiving unit.

As described above, one symbol of transmitting data is carried and transmitted on a plurality of sub-carriers. Therefore, even when a sub-carrier with a specific frequency is greatly affected by frequency-dependent fading, sometimes another sub-carrier with another frequency is seldom affected by the fading. Therefore, when the transmitted signal is decoded, the influence of frequency-dependent fading can be suppressed to a low level.

FIG. 4 shows a guard interval.

The top section of the data of a prescribed length transmitted from a transmitter is copied and attached to the end section of the data as a guard interval (GI). The length of the guard interval is determined in such a way that the delay of a wave that has been delayed due to multi-path and the like and reaches a receiver can be accommodated in this guard interval.

The reason why such a guard interval is provided is as follows.

Specifically, data and a guard interval are carried and transmitted on a plurality of sub-carriers. However, if attention is focused on one sub-carrier, data to which Fourier transformation has been applied once is accommodated in one cycle of a sub-carrier with fundamental frequency or in one cycle of a sub-carrier with a frequency obtained by multiplying the fundamental frequency by an integer. In Fourier transformation, if each frequency component is extracted, the fact that in one cycle of the fundamental frequency, sub-carriers are orthogonal to one another is utilized. Therefore, in order to correctly extract each frequency component, the data of a received signal to which Fourier transformation is applied must be carried in a cycle of a sub-carrier with a frequency obtained by multiplying the fundamental frequency by an integer. Otherwise, orthogonality between sub-carriers will be destroyed. In this case, even when Fourier transformation is applied, a correct value cannot be obtained.

In particular, if a delay wave is received due to multi-path and the like, as shown in FIG. 4, the data of the wave is delayed and arrives later than the data of a direct wave. Therefore, if Fourier transformation is applied to the shaded part shown in FIG. 4 when subsequent data follows immediately after, inter-symbol interference (ISI) occurs.

In this case, as shown in FIG. 4, if a guard interval is attached, a sub-carrier for carrying the guard interval is continuously connected to the end section of data and the sub-carrier is expanded by the guard interval, since the guard interval is the copy of the top section of the data of a prescribed length. If the delay wave reaches the receiver within a delay time covered by the length of a guard interval, the Fourier transformation of both the direct and delay waves is conducted in one cycle of the fundamental frequency, even when Fourier transformation is applied to the shaded part shown in FIG. 4. Therefore, a correct value can be obtained. Since no piece of another data follows immediately after the data, there is no inter-symbol interference. Although the result of Fourier transformation of data including the delayed wave includes amplitude change and phase rotation, the amplitude change and phase rotation can be predicted and compensated for by channel prediction and channel compensation, respectively.

As described above, by providing a guard interval, the result of Fourier transformation is compensated for and inter-symbol interference can be prevented, even when there is a delay.

Figure 5:
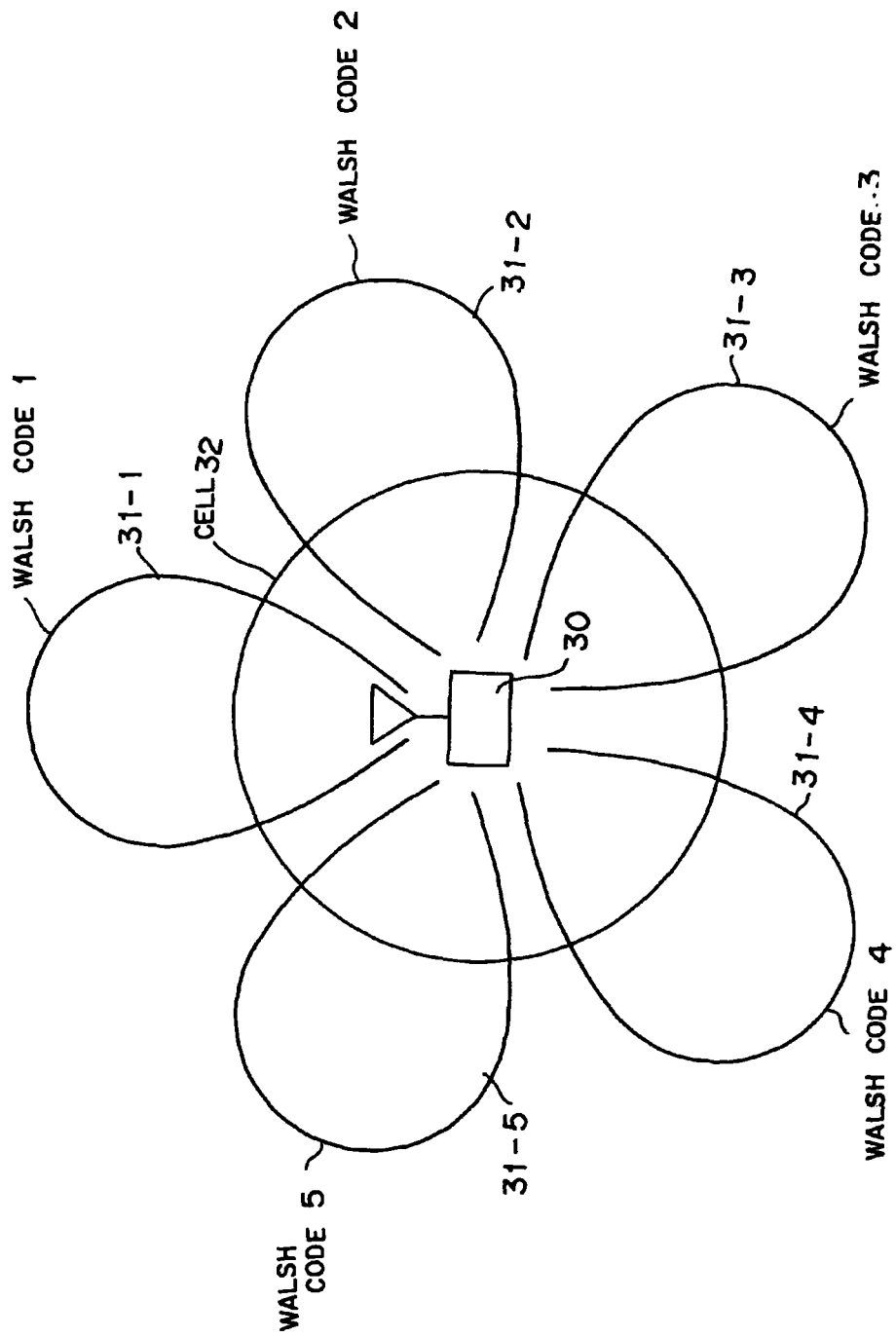
FIG. 5 shows relations among a base station, a cell and a radio wave with directivity transmitted from the base station.

FIG. 5 shows the relations among a base station, a cell and a radio wave with directivity transmitted from the base station.

A base station 30 has its own territory, and when a mobile terminal enters the territory, the base station 30 transmits/receives radio waves to/from the mobile terminal. This territory is usually called a "cell" 32. The base station 30 can transmit across the entire cell. Alternatively, the base station 30 can divide the cell 32 into several sub-territories 31-1 through 31-5 and manage the sub-territories utilizing the directivity of each radio wave to be transmitted.

The base station 30 allocates a different channel to each radio wave to be transmitted to each of the sub-territories 31-1 through 31-5 and distinguishes each radio wave assigning one of different Walsh codes 1 through 5 to each radio wave. Therefore, each mobile terminal receiving a radio wave from the base station 30 can specify a receiving channel and know its own sub-territory and relevant radio wave by detecting the used Walsh code.

Figure 6:
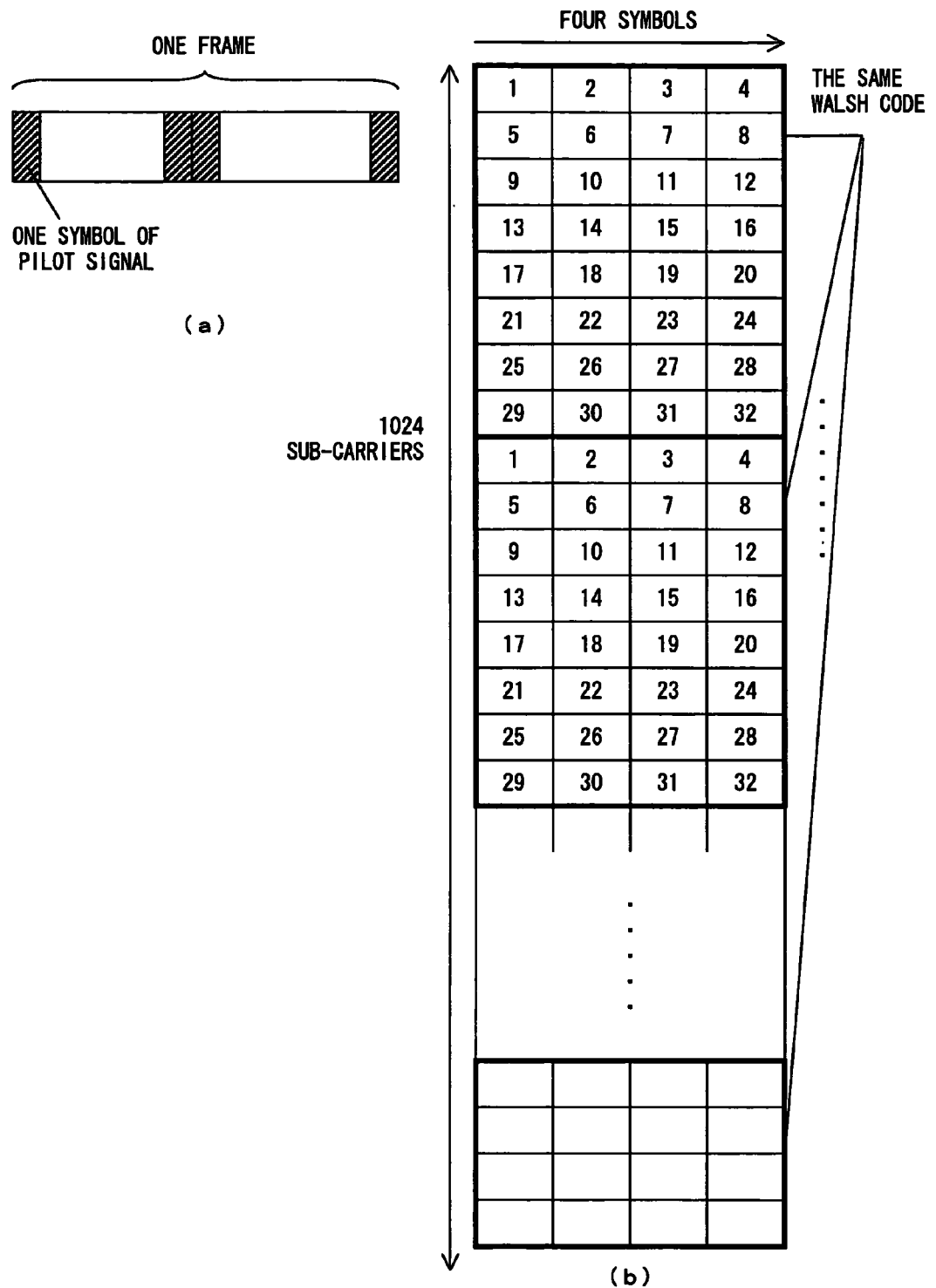
FIG. 6 shows a pilot signal used to calculate a channel prediction value.

FIG. 6 shows a pilot signal used to calculate a channel prediction value.

As shown in FIG. 6A, it is assumed that one frame accommodates four pilot signal symbols. An arbitrary pilot signal symbol can be arrayed in an arbitrary place. Although in the preferred embodiment it is assumed that the four pilot signal symbols are arrayed as shown in FIG. 6A, the number of transmits is not essential to the subject matter of the preferred embodiment.

As described earlier, in the case of a pilot signal, one symbol of a pilot signal is carried on all sub-carriers for one time slot, different from the case of data. Since a time slot for which one symbol of a pilot signal is carried is determined and is different from the data symbols, a channel prediction unit extracts only a time slot including the symbol of a pilot signal and stores the time slot in a memory.

FIG. 6B shows data stored in the memory of a channel prediction unit.

As shown in FIG. 6B, four pilot signal symbols, each of which is carried on 1,024 sub-carriers are stored in the memory. The array of Walsh codes (spread code for specifying a channel (channeling)) to be multiplied to a pilot signal is also different from that of data. As shown in FIG. 6B, in the case of a Walsh code of 32-chip length, one chip is arrayed in order for four symbols in a symbol (time slot) direction and one chip is arrayed in order for eight sub-carriers in a sub-carrier direction. The multiplication of such a Walsh code should be controlled in a transmitter.

As shown in FIG. 6B, a pilot signal is repeatedly multiplied by the same block of a Walsh code composed of four symbols-by-eight sub-carriers, that is, for 1,024 sub-carriers without overlapping.

In FIG. 6B, it is described as if only one Walsh code were multiplied. However, in reality, a plurality of Walsh codes are superposed and received, and are stored in the memory of a channel prediction unit since there is a possibility that a plurality of radio waves out of the radio waves with directivity covering the sub-territories 31-1 through 31-5 shown in FIG. 5 may be received.

FIG. 7 shows the basic operation in the preferred embodiment of the present invention.

According to the preferred embodiment, the channel prediction value of one sub-carrier is calculated by averaging those of adjacent eight sub-carriers. Although the number of sub-carriers is not limited to eight, each of the adjacent sub-carriers must have a frequency close to that of the sub-carrier, whose channel prediction value is calculated, sufficiently to calculate a channel prediction value. Specifically, it is considered that if a frequency of a sub-carrier is too far away from that of the sub-carrier, whose channel estimation value is calculated, the channel fluctuation of such a sub-carrier is greatly different from that of the sub-carrier, whose channel prediction value is calculated. Therefore, if the values of such sub-carriers are averaged, the channel prediction value of the sub-carrier, whose channel prediction value is calculated, is not correct.

In the preferred embodiment, it is considered that if each of eight sub-carriers adjacent to the target sub-carrier have almost the same channel prediction value to that of the target sub-carrier, the effect of noise elimination can be improved by averaging their channel prediction values and it is used as the average channel prediction value.

In order to obtain an average channel prediction value across the four symbols-by-eight channels of a specific channel's pilot signal, a Walsh code of 32-chip length is used as a mutually orthogonal code and is accommodated in the four symbols-by-eight channels.

In the preferred embodiment of the present invention, first, the first channel prediction value can be obtained as follows. First, the values of four symbols for each of the first to eighth sub-carriers of a pilot signal stored in the memory of a channel prediction unit are obtained by multiplying each of the four symbols by the Walsh code shown in FIG. 6B and the obtained values are added for the four symbol-by-eight sub-carriers.

Then, the channel prediction value of a subsequent sub-channel can be obtained by shifting the block by one row, multiplying each of the four symbols by a Walsh code and adding the obtained values for the four symbol-by-eight channels in the same way.

In this way, the channel prediction value of a sub-channel is calculated after sequentially shifting a target block, whose channel prediction values are calculated.

Usually, a pilot signal stored in the memory of a channel prediction unit is multiplied by a plurality of Walsh codes for a plurality of channels and the plurality of multiplied pilot signals is superposed. However, by multiplying a specific Walsh code, only a specific channel can be extracted. As clearly seen from FIG. 6B, if a block is shifted by one row, the rows are simply replaced and the first through fourth chips of a Walsh code are located at the bottom. If a reading position is changed, the pastern of the Walsh code included in a block is the same. Therefore, even when a target block is shifted by one row, the target channel can be extracted. When shifting a subsequent target block by one row in order, the same fact applies.

In the preferred embodiment, the channel prediction value of each sub-channel is calculated by shifting a block covering signals, whose channel prediction values are calculated and averaged, sequentially, utilizing the fact. Thus, eight carriers of sub-carriers centered on the sub-carrier to which channel prediction is applied, can be added and averaged, and accordingly, a high-accuracy channel prediction value can be obtained.

Figure 8:
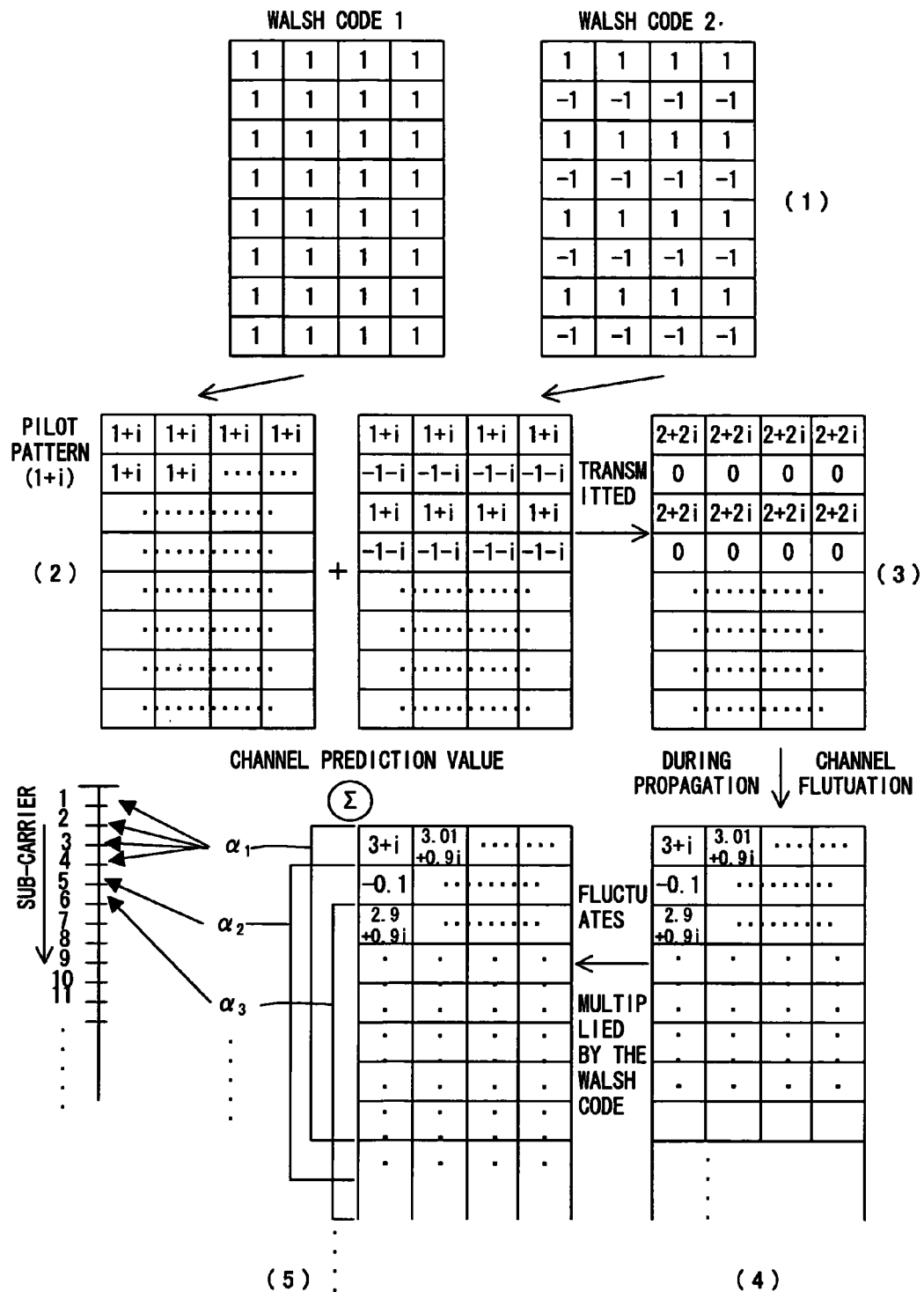
FIG. 8 shows the flow of a pilot signal and the calculation process of a channel prediction value in the preferred embodiment.

FIG. 8 shows the flow of a pilot signal and the calculation process of a channel prediction value in the preferred embodiment.

In FIG. 8, although only data for four symbols-by-eight sub-carriers is shown, in reality, there are more (for example, 1,024) sub-carriers.

When signals are transmitted/received, in reality, the processes described with reference to FIGS. 1 through 4 are performed. However, in FIG. 8, processes that are not directly related to the preferred embodiment of the channel prediction method in the present invention are omitted.

First, two Walsh codes 1 and 2 are prepared in a transmitter in order to distinguish channels from each other, as shown as (1) in FIG. 8. If it is assumed that a pilot signal's symbol pattern is, for example, (1+i) (i: imaginary unit), the symbol pattern is multiplied by each of Walsh codes 1 and 2 and the products are prepared as shown as (2) in FIG. 8. Then, at the transmitting stage, the products of the two pilot signal's symbol patterns of each of Walsh codes 1 and 2 are added (see (3) of FIG. 8) and transmitted.

The transmitted signal undergoes a channel fluctuation while propagating in the air and individual signal values undergo a fluctuation. A receiver receives the signal that has undergone such a channel fluctuation. In the receiver, this signal is multiplied by a Walsh code for each block as shown in FIG. 6B and the signal values of all the sub-carriers are obtained for four symbols of a pilot signal (see (5) of FIG. 8). In FIG. 7, it has been described that a pilot signal symbol is multiplied by a Walsh code after shifting a block by one row and the products are added for eight sub-carriers. However, as shown in FIG. 8, a Walsh code can also be multiplied for each block after signal values for all symbols by all sub-carriers of a pilot signal to be used to calculate a channel prediction value are stored in a memory and the like.

Then, as shown as (5) in FIG. 8, channel prediction value α1 is obtained by selecting a block of four symbols-by-eight sub-carriers from the product obtained by multiplying the block by a Walsh code and adding all the signal values included in this block.

Then, in the case that the other channel prediction value is calculated, channel prediction value α2 is obtained by multiplying a subsequent block by a Walsh code after shifting the block by one sub-carrier and adding all the signal values in the block according to the preferred embodiment of the channel prediction value calculation method of the present invention shown in FIG. 7. Channel estimation value α3 and the like are obtained in the same way.

Each channel estimation value calculated in this way is used as the channel prediction value of each sub-carrier. In particular, since a sub-carrier, whose channel prediction value is calculated, located in almost the center of the sub-carrier direction in adding/averaging produces a higher-accuracy channel estimation value, the fourth sub-carrier of eight sub-carriers, whose channel prediction values are averaged, is made to fall on the sub-carrier, whose channel prediction value is calculated.

Specifically, as shown as (5) in FIG. 8, since the first three sub-carriers 1 through 3 cannot be set as described above, channel prediction value α1 is used for the first three sub-carriers 1 through 3. Since sub-carrier 4 falls on the fourth sub-carrier when channel prediction value α1 is calculated, the channel prediction value α1 is used for the fourth sub-carrier. Channel prediction value α2 obtained after shifting a target block by one row is used for sub-carrier 5. Similarly, channel estimation value α3 is used for sub-carrier 6. In sub-carriers located close to the end, the same phenomenon as that of each of sub-carriers 1 through 3 occurs. In this case too, a channel prediction value obtained last is used for the last several sub-carriers.

Figure 9:
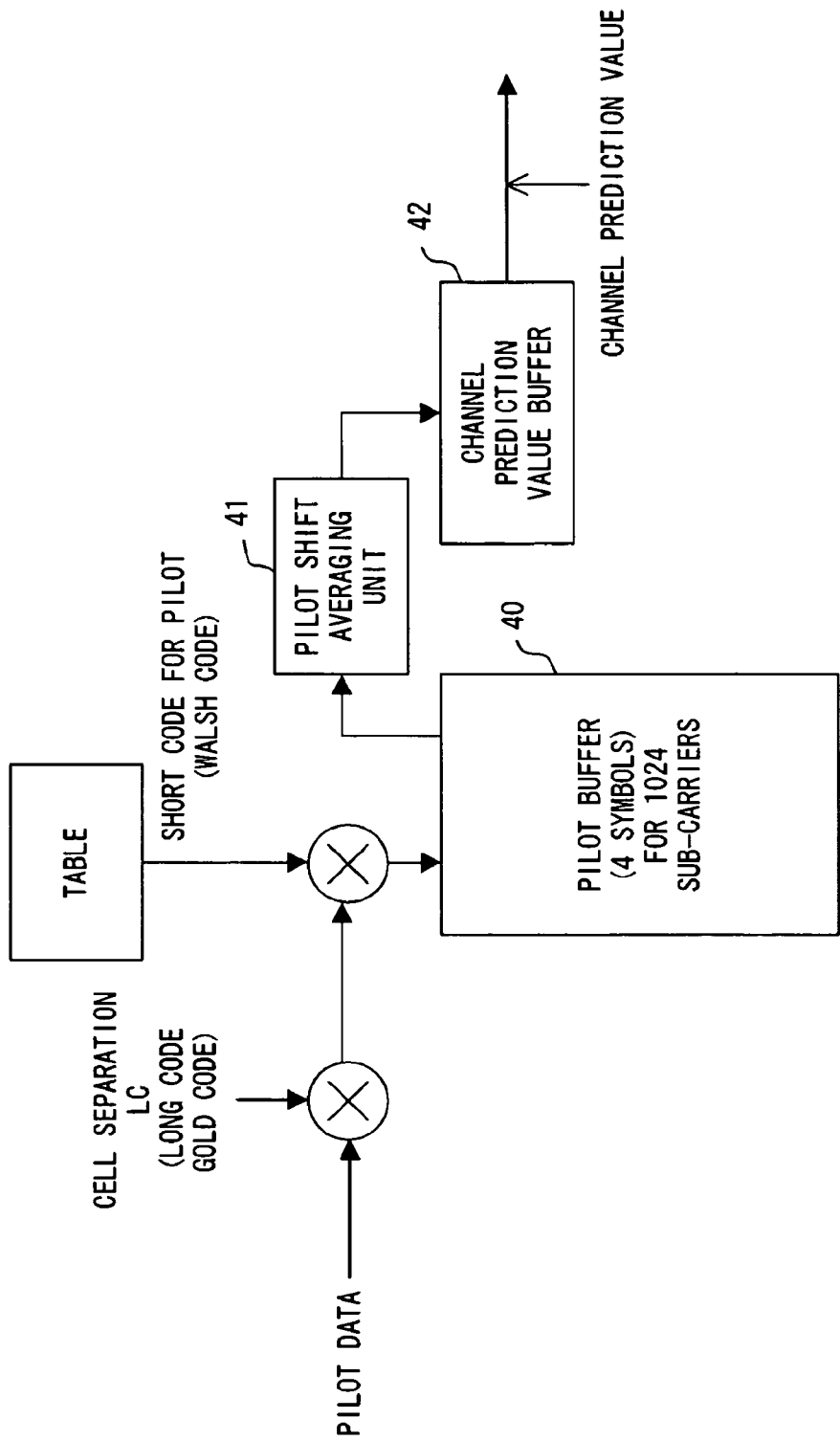
FIG. 9 shows the configuration of a channel prediction unit used in the preferred embodiment of the present invention.

FIG. 9 shows the configuration of a channel prediction unit used in the preferred embodiment of the present invention.

On receipt of pilot signal data, the channel prediction unit multiplies the data by a long code (LC) (corresponding to complex conjugate of a gold series code in FIG. 3) in order to separate cells and extracts the pilot signal data of the target cell. Then, the pilot signal data of the separated cell is multiplied by a short code for pilot (corresponding to a Walsh code; the multiplication method is as has been already described in FIGS. 6 through 8) read from a table. The product is stored in a pilot buffer 40.

In the case of the configuration shown in FIG. 9, data for all symbols-by-all sub-carriers (in the example of the preferred embodiment, four symbols-by-1,024 sub-carriers) are stored. Therefore, in this case, all signal values to be used are multiplied by a Walsh code prior to channel prediction value calculation.

A pilot shift averaging unit 41 reads the signal values stored in the pilot buffer 40 for a unit block, whose channel prediction values are calculated. Then, the read signal values for a block are added and stored in a channel prediction buffer 42. Then, the signal values are output from the channel prediction unit as the channel prediction values.

Figure 10:
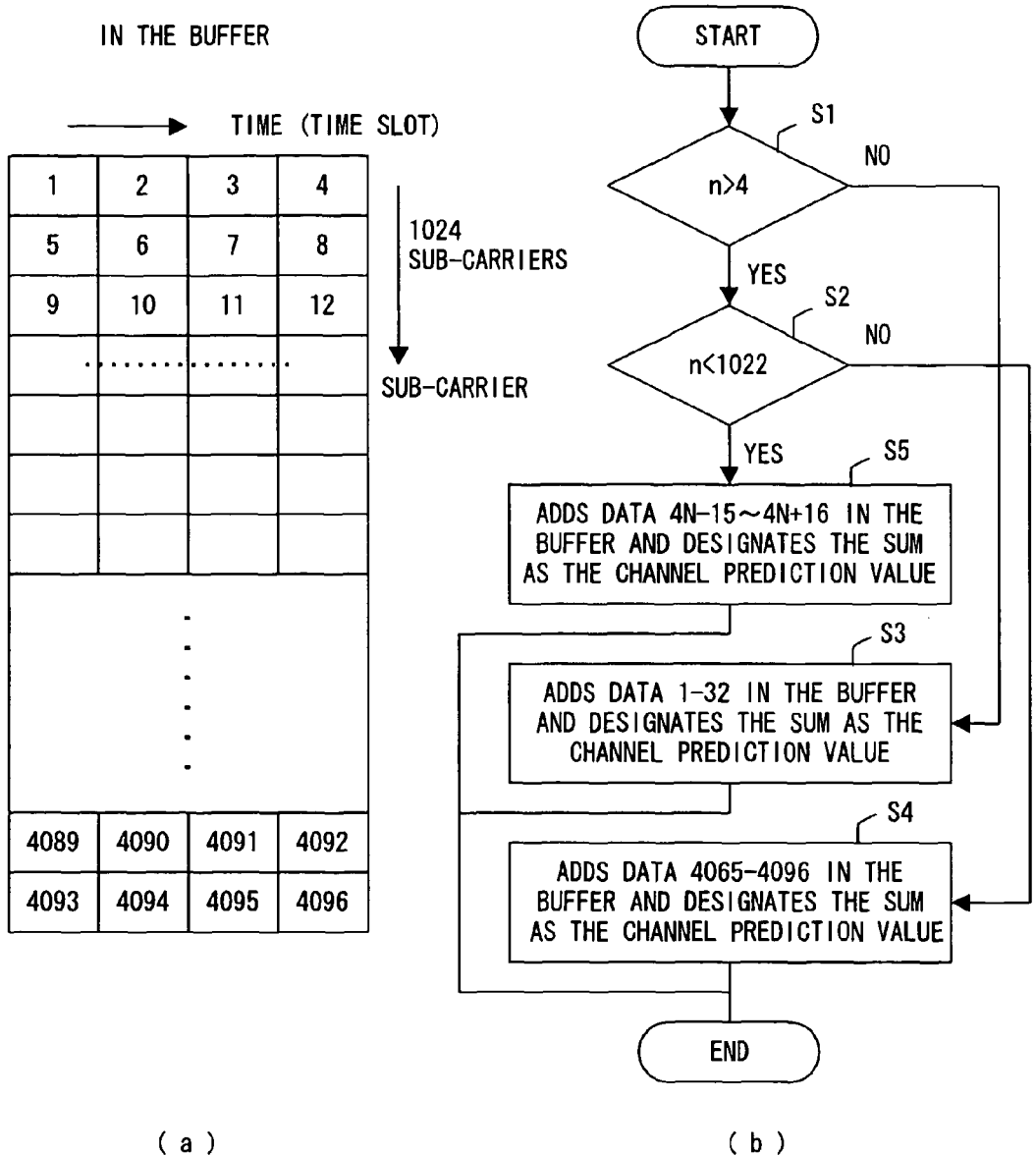
FIG. 10 is a flowchart showing the operation of the pilot shift averaging unit 41 shown in FIG. 9 and also shows the data in the pilot buffer shown in FIG. 9.

FIG. 10 is a flowchart showing the operation of the pilot shift averaging unit 41 shown in FIG. 9 and also shows data in the pilot buffer shown in FIG. 9.

As shown in FIG. 10A, data for four time slots (corresponding to four symbols of a pilot signal) and data for 1,024 sub-carriers are vertically and horizontally, respectively, stored in the pilot buffer. As shown in FIG. 9, the data has been already multiplied by a Walsh code.

According to the flowchart shown in FIG. 10B, when the channel prediction value of the n-th sub-carrier is calculated, first, in step S1, the pilot shift averaging unit 41 judges whether n>4. If the judgment in step S1 is no, in step S3, data 1 through 32 in the pilot buffer are added and this sum is designated as the channel prediction value. Then, the process terminates.

If the judgment in step S1 is yes, in step S2, it is further judged whether n<1,022. If the judgment in step S2 is no, in step S4, data 4,065 through 4,096 in the pilot buffer are added and this sum is designated as the channel prediction value. Then, the process terminates.

If the judgment in step S2 is yes, data 4n−15 through 4n+16 are added and this sum is designated as the channel prediction value. Then, the process terminates.

Since the channel prediction value of the n-th sub-carrier is calculated in this way, the channel prediction values of all the sub-carriers can be obtained by repeating the same calculation from when n starts with 1 until n reaches 1,024.

Figure 11:
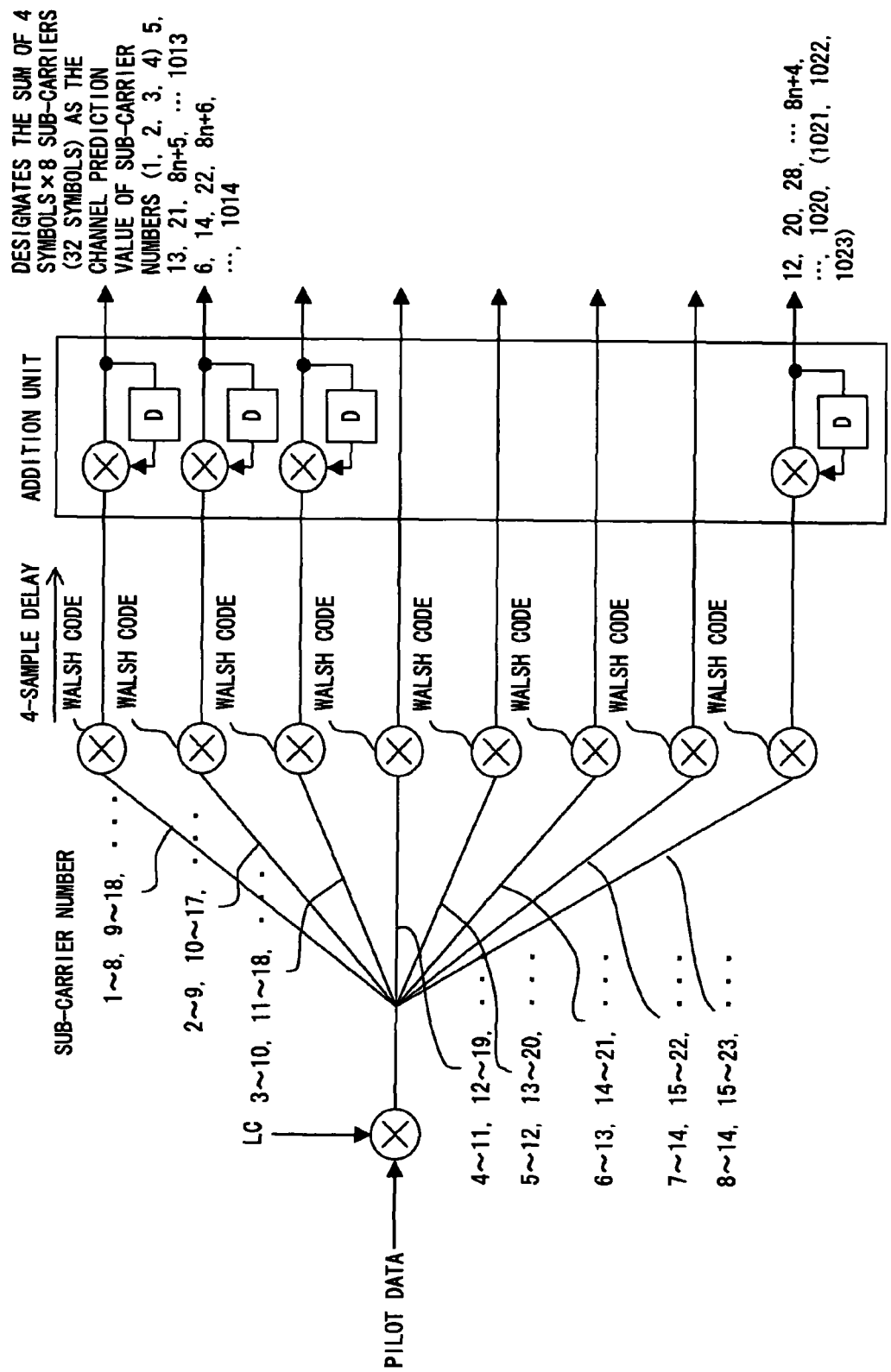
FIG. 11 shows another channel prediction value calculation method.

FIG. 11 shows another preferred embodiment of a channel estimation value calculation method.

In this configuration, first, pilot signal data is input and the data is multiplied by a long code (for separating cells; complex conjugate of the gold series code described earlier). Then, the data is divided into sets of a plurality of pieces of data for (n+8j)-th (j=0,1,2, . . . ) sub-carriers, that is, data for the first sub-carrier and sub-carriers, whose numbers are a common multiple of eight of the first sub-carrier, such as the ninth sub-carrier, seventeenth sub-carrier and the like, data for the second sub-carrier and sub-carriers, whose numbers are a common multiple of eight of the second sub-carrier, and the like.

Then, each set is multiplied by a Walsh code. As for multiplication method of Walsh code, when n=1, a Walsh code is multiplied without delay. When n=2, a Walsh code cyclically delayed by four bits is multiplied. Therefore, when n=m (m: positive number), data is multiplied by a Walsh code cyclically delayed by 4m samples. Then, an addition unit multiplies data by a Walsh code in order, adds a plurality of pieces of data serially output for 32 (=4×8) symbols and outputs the sum as the channel prediction value.

In the preferred embodiment described above, although a gold series code and a Walsh code are used for a spread code for separating cells and a spread code for channeling, respectively, the spread code for separating cells and that for channeling are not limited to the gold series code and Walsh code, respectively.

In the preferred embodiment described above, although one frame accommodates four symbols, the number of symbols accommodated in one frame is not limited to four.

Furthermore, in the preferred embodiment described above, although the number of sub-carriers is 1,024, it is not limited to this number. For example, it can be it's half, that is, 512.

In the preferred embodiment described above, although a Walsh code is 32 chip long, it is not limited to this length and a person having ordinary skill in the art should appropriately select it.

According to the present invention, a high-accuracy channel prediction value that is averaged in time and sub-carrier directions can be efficiently obtained for each sub-carrier.

What is clamed is:

1. A channel estimation device operable to receive a plurality of sub-carriers having different frequencies, comprising:

a receiving unit operable to receive sub-carriers $S_1$ to $S_p$ (P being an integer), by which a spread pilot signal block is transmitted, and sub-carriers $S_{p+1}$ to $S_{2p}$, by which a spread pilot signal block is transmitted, wherein spread pilot signals transmitted by each sub-carrier $S_i$ (i=1 to P) are identical to spread pilot signals transmitted by corresponding sub-carrier $S_{p+i}$ (i=1 to P) and spread pilot signals of a spread pilot signal block are spread and code-multiplexed in a frequency direction in the sub-carriers for transmission;

a first multiplying unit operable to multiply received spread pilot signals of the sub-carriers $S_1$ to $S_{2p}$ with a long code for despreading to generate a first multiplied result;

a second multiplying unit operable to multiply the first multiplied result with a plurality of cyclically delayed spread codes and generate a plurality of second multiplied results associated with subcarriers $S_1$ to $S_{2p}$;

a plurality of adding units to output a plurality of added multiplied results usable to estimate channels, by multiplying a second multiplied result associated with m subcarriers (m being an integer less than $2_p$), of the plurality of second multiplied results, with a delayed second multiplied result associated with the m subcarriers, and adding n symbols (n being an integer) of the second multiplied result associated with the m subcarriers to generate an added multiplied result of the plurality of added multiplied results.

2. The channel estimation device according to claim 1, wherein each of the plurality of added multiplied results is usable to estimate each channel.

3. The channel estimation device according to claim 1, wherein the plurality of added multiplied results for the sub-carrier $S_i$ to $S_{p+i}$ (i=1 to P) is used for estimation of a channel corresponding to a center sub-carrier among the sub-carriers $S_i$ to $S_{p+i}$ (i=1 to P).

4. The channel estimation device according to claim 2, wherein in a spread pilot signal block received by the receiving unit, the n symbols are added in the spread pilot signal block in such a way that a sub-carrier of the spread pilot signal block, whose channel estimation value is calculated, is located in almost center of sub-carrier frequency direction of the spread pilot signal block.

5. The channel estimation device according to claim 1, wherein a spread code of the plurality of spread codes for channeling is a Walsh code.

6. The channel estimation device according to claim 5, wherein the Walsh code is 32 chips long.

7. The channel estimation device according to claim 1, wherein a spread code of the plurality of spread codes for separating cells is a gold series code.

8. The channel estimation device according to claim 1, wherein the spread pilot signal accommodates four symbols in its data frame.

9. The channel estimation device according to claim 1, wherein size of the spread pilot signal block is four symbols-by-eight sub-carriers.

10. A channel estimation method used in a channel estimation device operable to receive a plurality of sub-carriers having different frequencies, the method comprising:

receiving sub-carriers $S_1$ to $S_p$ (P being an integer), by which a spread pilot signal block is transmitted, and sub-carriers $S_{p+1}$ to $S_{2p}$, by which a spread pilot signal block is transmitted, wherein spread pilot signals transmitted by each sub-carrier $S_i$ (i=1 to P) are identical to spread pilot signals transmitted by corresponding sub-carrier $S_{p+i}$ (i=1 to P) and spread pilot signals of a spread pilot signal block are spread and code-multiplexed in a frequency direction in the sub-carriers for transmission;

multiplying received spread pilot signals of the sub-carriers $S_1$ to $S_{2p}$ with a long code for despreading to generate a first multiplied result;

multiplying the first multiplied result with a plurality of cyclically delayed spread codes and generating a plurality of second multiplied results associated with subcarriers $S_1$ to $S_p$;

generating a plurality of added results, each added result generated by:

multiplying a second multiplied result associated with sub-carriers $S_1$ to $S_p$, of the plurality of second multiplied results, with a delayed second multiplied result associated with the subcarriers $S_1$ to $S_p$ and adding n symbols (n being an integer) of the second multiplied result associated with the subcarriers $S_1$ to $S_p$ to generate an added multiplied result of the plurality of added multiplied results; and estimating channels using the plurality of added multiplied results.

11. The channel estimation method according to claim 10, wherein each channel is estimated using each of the plurality of added multiplied results.

12. The channel estimation method according to claim 10, wherein the plurality of added multiplied results for the sub-carrier $S_i$ to $S_{p+i}$ (i=1 to P) is used for estimation of a channel corresponding to a center sub-carrier among the sub-carrier $S_i$ to $S_{p+i}$ (i=1 to P).

13. The channel estimation method according to claim 11, wherein in a spread pilot signal block received by the receiving, the n symbols are added in the spread pilot block in such a way that a sub-carrier, whose channel prediction value is calculated, is located in almost center of sub-carrier frequency direction of the spread pilot signal block.

14. The channel estimation method according to claim 10, wherein a spread code of the plurality of spread codes for channeling is a Walsh code.

15. The channel estimation method according to claim 14, wherein the Walsh code is 32 chips long.

16. The channel estimation method according to claim 10, wherein a spread code of the plurality of spread codes for separating cells is a gold series code.

17. The channel estimation method according to claim 10, wherein the spread pilot signal accommodates four symbols in its data frame.

18. The channel estimation method according to claim 10, wherein size of the spread pilot signal block is four symbols-by-eight sub-carriers.

* * * * *